United States Patent [19]

Chaplin

[11] Patent Number: 5,386,242

[45] Date of Patent: Jan. 31, 1995

[54] SELF KEYER WITH BACKGROUND GAP FILL

[75] Inventor: Daniel J. Chaplin, Nevada City, Calif.

[73] Assignee: The Grass Valley Group, Inc., Nevada City, Calif.

[21] Appl. No.: 209,764

[22] Filed: Mar. 14, 1994

[51] Int. Cl.$^6$ ............................................. H04N 5/275
[52] U.S. Cl. .................................................... 348/591
[58] Field of Search ............... 348/591, 592, 590, 597, 348/593–596, 584–589, 598–600, 564–566; H04N 5/275, 5/272, 5/265, 5/262, 5/268, 5/278, 9/74, 9/75, 9/76; 345/144, 116; 395/135

[56] References Cited

U.S. PATENT DOCUMENTS

| | | | |
|---|---|---|---|
| 4,488,169 | 12/1984 | Yamamoto | 348/597 |
| 4,800,432 | 1/1989 | Barnett et al. | 348/592 |
| 4,920,415 | 4/1990 | Chaplin | 358/183 |
| 4,947,255 | 8/1990 | Jackson et al. | 348/590 |
| 5,146,333 | 9/1992 | Chaplin | 358/182 |
| 5,313,275 | 5/1994 | Daly et al. | 348/592 |

*Primary Examiner*—Victor R. Kostak
*Assistant Examiner*—Safet Metjahic
*Attorney, Agent, or Firm*—Francis I. Gray

[57] ABSTRACT

A self keyer with background gap fill adds background video to the gap between the background video and a fill video resulting from self key error. The self keyer performs the general function:

$$\text{Composite} = \text{Fill} * f(\text{Key}) + \text{Background} * (1 - f(\text{Key}) * (\text{Key}))$$

where $f(\text{Key})$ is a programmable transfer function used to generate a multiplication factor, $f(\text{Key})$, for shaping or reshaping the fill video and to generate a hole cutting signal, $f(\text{Key}) * (\text{Key})$, for shaping the background video. The shaped foreground and background videos are combined to generate a composite video. The transfer function may be generated and stored in a PROM/RAM buffer as a lookup table by a CPU. The transfer function may also be generated interactively by adjusting various points on the transfer function individually, with the CPU storing the resulting transfer function in the PROM/RAM buffer.

8 Claims, 6 Drawing Sheets

SELF KEYER WITH BACKGROUND GAP FILL

BACKGROUND OF THE INVENTION

The present invention relates to video keyers, and more particularly to a self keyer that uses background video to fill gaps in a composited video scene.

Keying is a video process where two or more video signals are composited together into a single scene, such as a weatherman placed in front of a weather map. Currently there are two distinct algorithms for compositing two scenes into one scene: (i) a matte or additive key; or (ii) a multiplicative key.

For an additive key a fill video signal that is already shaped, i.e., the fill video signal is processed so that it appears against a black background, and a key signal that describes where the fill video signal occupies the scene are required. The additive key follows the equation:

Composite=Shaped Fill+Background*(1−Key)

The fill video is simply added to a hole that is cut in the background video by the key signal. A special case of a source for an additive keyer is a chroma key circuit. U.S. Pat. No. 4,409,611 issued Oct. 11, 1983 to Petro Vlahos entitled "Encoded Signal Color Image Compositing" is an example of additive keying as applied to chroma keys.

For a multiplicative key the fill video needs to be shaped or reshaped to define the portion of the fill video that is to become part of the composite. The multiplicative key follows the equation:

Composite=Fill*Key+Background*(1−Key)

A special type of multiplicative key is a self key where the key signal is derived from the fill signal itself. U.S. Pat. No. 4,920,415, issued Apr. 24, 1990 to Daniel J. Chaplin entitled "Self Keyer", shows an example of multiplicative self keying in FIG. 1.

The difference between the two keying methods is that the multiplicative key shapes or reshapes the fill video while the additive key simply adds the fill video to a hole cut in the background by the key signal. Although additive keys appear to be more correct since the edge of the fill is not distorted, there are many instances where self keys are used since they may give a better result visually by providing a softer appearance with less noise.

The problem with self keys is that reshaping the fill video distorts the edge of the fill video so that when it is added to the hole in the background video, the two scenes do not add up—there is a gap which shows as a black line around the fill part of the composited scene. To combat this problem traditionally the derivation of the key signal is made with a variable gain comparator which is set for high gain with a high clip value. This narrows the gap between the background and fill video edges, but is unpleasant in appearance because the edges of the resultant key are harsh and any edge noise is noticeable.

The above mentioned U.S. Pat. No. 4,920,415, to reduce the appearance of the gap, fills the gap with a variable luminance level. By varying the luminance level a balance is made between the fill and background that subjectively reduces the visual impact. Unfortunately the gray level often is only a compromise, resulting in some edges too light and others too dark, with glassware taking on a gray lackluster appearance.

Another method of reducing the appearance of the gap is disclosed in U.S. Pat. No. 5,146,333 issued Sep. 8, 1992 to Daniel J. Chaplin entitled "Self Keyer with Pre-Emphasized Fill Video". In this technique the fill signal is pre-emphasized at the edges so that the error in the self key that produces the gap is reduced.

What is desired is a self keyer that improves the appearance of composited scenes.

SUMMARY OF THE INVENTION

Accordingly the present invention provides a self keyer with background gap fill that predicts a self key error by determining the difference between an ideal response and an actual response. The self keyer uses the self key error to shape the background video for a composite scene to add a bit of the background video in the gap between foreground and background videos caused by the self key error. A key signal is derived from a fill video. The key signal is processed to produce a control signal that is a function of the key signal according to a specified transfer function for shaping the fill video. The control signal and key signal are also used to generate a mixer control signal for cutting a hole in the background video, i.e., shaping the background video. The shaped fill and background videos are combined to produce a composite video representing the composite scene. The multiplication of the transfer function by the key signal serves to provide additional background video to fill the gap between the shaped fill and background videos.

The objects, advantages and other novel features of the present invention are apparent from the following detailed description when read in conjunction with the appended claims and attached drawing.

DESCRIPTION OF THE PREFERRED EMBODIMENT

Figure 1:
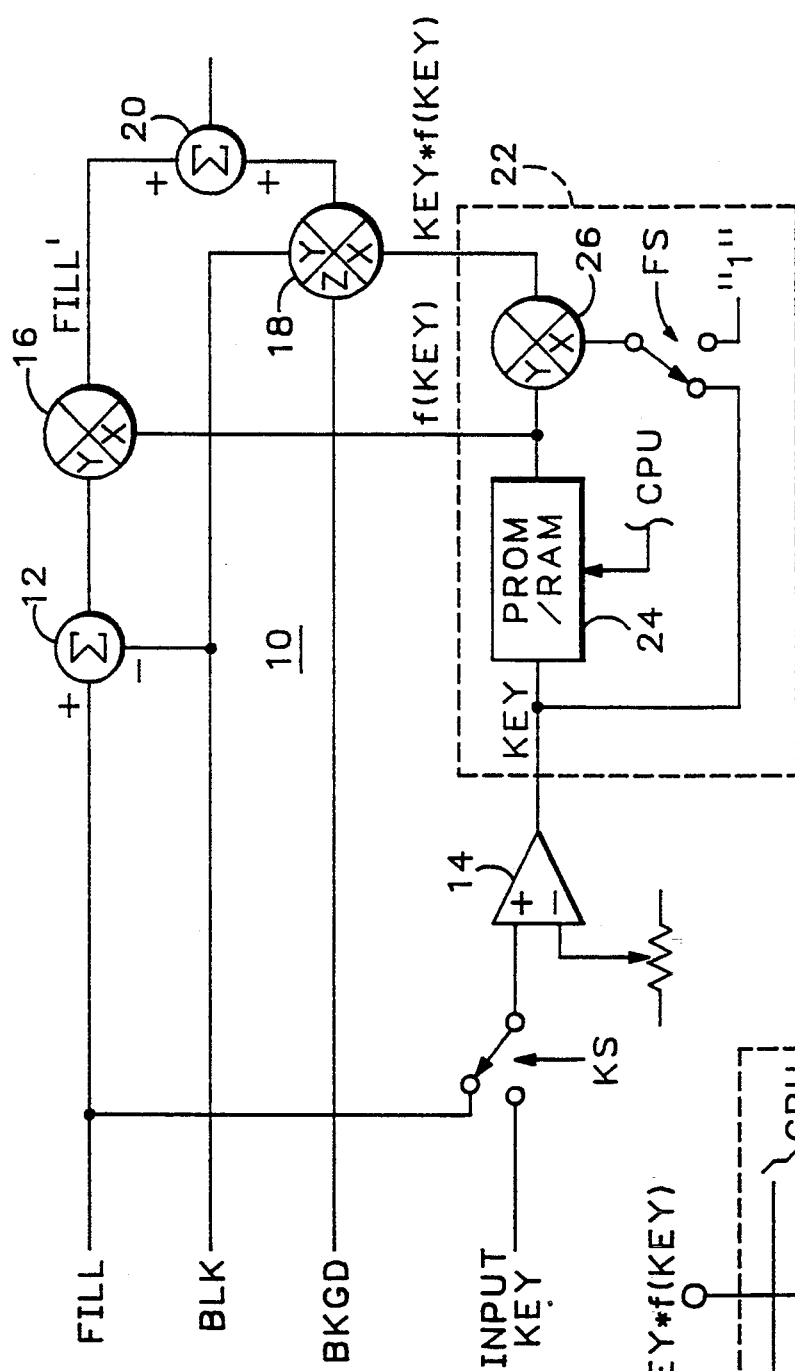
FIG. 1 is a block diagram of a self keyer according to the present invention.

Referring now to FIG. 1 a multiplicative keyer 10 with self key is shown according to the present invention. A fill video signal FILL is input to a first summation circuit 12 to remove black setup from FILL so there is only one black setup level in the self keyer 10, and also to a clip and gain circuit 14 via a key switch KS. The output of the clip and gain circuit 14 is a key signal KEY, which is either a self key signal or an external key signal depending upon the position of the key switch KS. A black video signal BLK is subtracted from FILL in the first summation circuit 12, and the result is input to a first multiplier circuit 16. A control signal, which is a function of the key signal, is also applied to the first multiplier circuit 16, and the output is a shaped or reshaped fill video signal FILL'. BLK and a background video signal BKGD are input to a mixer 18 having a control terminal at which a control key signal, as discussed below, is applied. The mixer 18 produces an output according to the following equation:

$$OUT = X*Y + (1-X)*Z$$

which cuts a hole in BKGD and fills the hole with BLK where FILL is to appear in a composite scene. The outputs from the mixer 18 and from the first multiplier 16 are combined in a second summation circuit 20 to produce a composite video signal that represents the composite scene. Applying the output from the clip and gain circuit 14 directly as the control key signal for the mixer 18 and as the control signal for the first multiplier 16 produces a multiplicative keyer as shown in the above-referenced U.S. Pat. No. 4,920,415.

However the key signal from the clip and gain circuit 14 is input to a transform circuit 22 to produce a pair of key signals: the control signal f(KEY) and the control key signal KEY*f(KEY). The transform circuit 22 has a programmable read only memory (PROM) or a random access memory (RAM) 24 to which KEY is input. The PROM/RAM 24 provides as an output in response to KEY the function f(KEY), which is a programmable function of KEY as described further below. More than one transfer function may be stored in the PROM/RAM 24 so that a CPU (not shown) may select different functions on the fly as a result of operator action, or the CPU may download different transfer functions to the PROM/RAM. f(KEY) is applied to the first multiplier 16 to shape or reshape FILL. f(KEY) also is input to a second multiplier 26 together with KEY via a function switch FS to produce KEY*f(KEY) which is used to cut the hole in BKGD. With the function switch FS in its alternate position, a logical "1" is applied to the second multiplier 26, and if the PROM/RAM 24 contains a unity transfer function so that the output equals the input, then a conventional multiplicative keyer is emulated. The function stored in the PROM/RAM 24 controls the behavior of the transition between FILL' and BKGD. More specifically it affects the shape of the transition edge. Multiplier 26 causes the self key gap area associated with the transition to be filled with BKGD.

The alternate position of the switch FS is normally used when the external key signal is applied to the clip and gain circuit 14 as a function of the type of source for FILL, i.e., whether FILL is already shaped and no reshaping is desired. For example if the external key has little or no spatial relationship to FILL, i.e., a scene which is cropped with a box where the external key is the box, FILL is shaped, a hole is cut in BKGD, and the two are added. Because this is not a self key, there is no gap although the circuit is still a multiplicative keyer. Or if an external chroma keyer input a shaped fill video signal as FILL with an associated key signal, a conventional multiplicative keyer would produce the gap, so switch FS is in the normal position. However some character generators produce a "shaped" fill video signal and associated key signal, but the shaped fill is bigger than the key so that the key defines the resultant edge. This allows the result to be anti-aliased since the character generator went to a lot of trouble to produce an anti-aliased key. In this case a conventional multiplicative keyer does not produce a gap, and the switch FS is in the alternative position.

Figure 2:
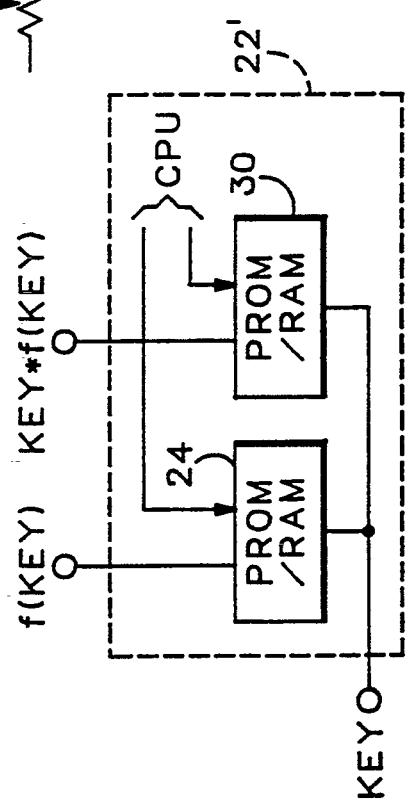
FIG. 2 is a block diagram of an alternate embodiment for a portion of the self keyer according to the present invention.

An alternative transform circuit 22' is shown in FIG. 2. In this embodiment a second PROM/RAM 30 replaces the second multiplier 26 and switch FS. The second PROM/RAM 30 contains the transfer function KEY*f(KEY). As above the CPU may select different functions as a result of operator action, and may download functions to the PROM/RAMs 24, 30. When the multiplicative keyer is not a self key, the selection of the function being applied to BKGD is the same as f(KEY), accomplishing the same thing as the switch FS above.

The transform circuits 22, 22' perform a general form equation for a self keyer as follows:

$$Composite = FILL*f(KEY) + BKGD*(1 - KEY*f(KEY))$$

When f(KEY) = KEY the function becomes:

$$Composite = FILL*KEY + BKGD*(1 - KEY^2)$$

Figure 3:
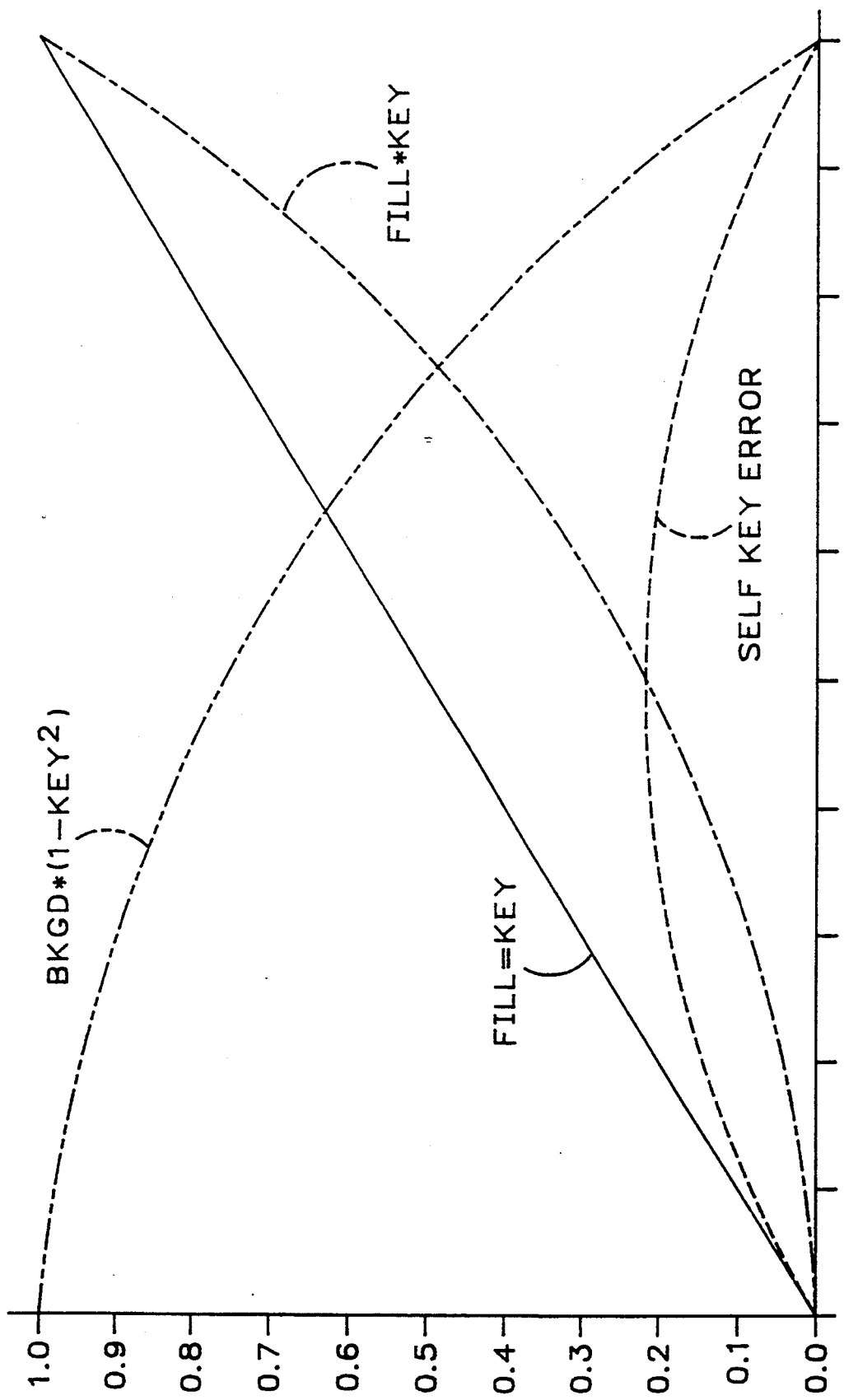
FIG. 3 is a graphic diagram illustrating a first transfer function for the self keyer according to the present invention.

This is very similar to the conventional multiplicative equation except that here BKGD is multiplied by $(1-KEY^2)$ instead of $(1-KEY)$. The square of KEY is what causes extra BKGD to be added to the composite where self key error occurs. So implementing this general form produces a multiplicative key with the gap caused by self key error filled with BKGD, as illustrated in FIG. 3.

When f(KEY) = 1, the function degenerates to the additive key equation:

$$Composite = FILL + BKGD*(1 - KEY)$$

Figure 4:
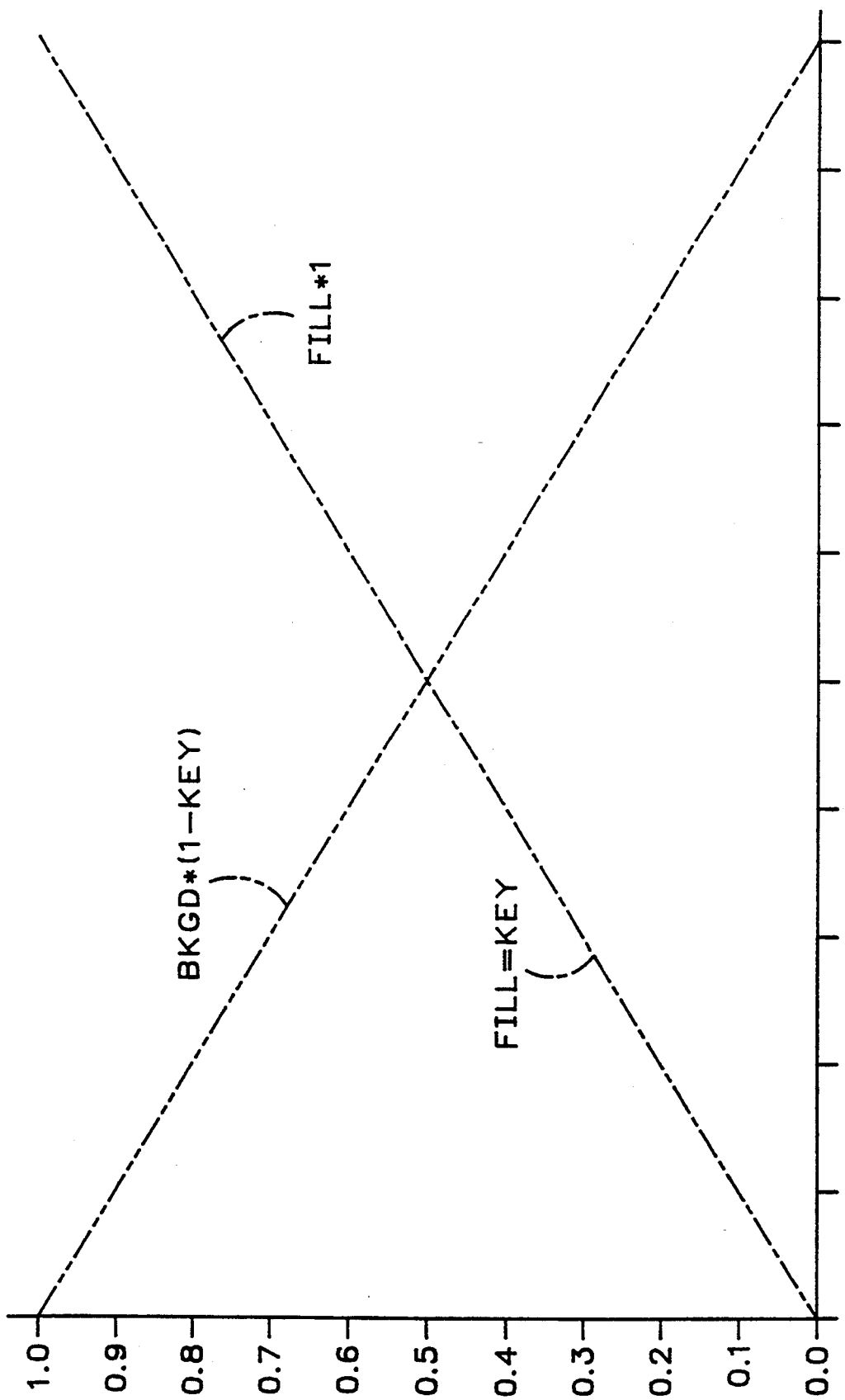
FIG. 4 is a graphic diagram illustrating a second transfer function for the self keyer according to the present invention.

There is no error in FILL, so only the hole cut in BKGD is needed with FILL added to the hole, as illustrated in FIG. 4.

A special case is the function $f(KEY) = 3*KEY - 2*KEY^2$:

$$Composite = FILL*(3*KEY - 2*KEY^2) + BKGD*(1 - 3*KEY^2 + 2*KEY^3)$$

Figure 5:
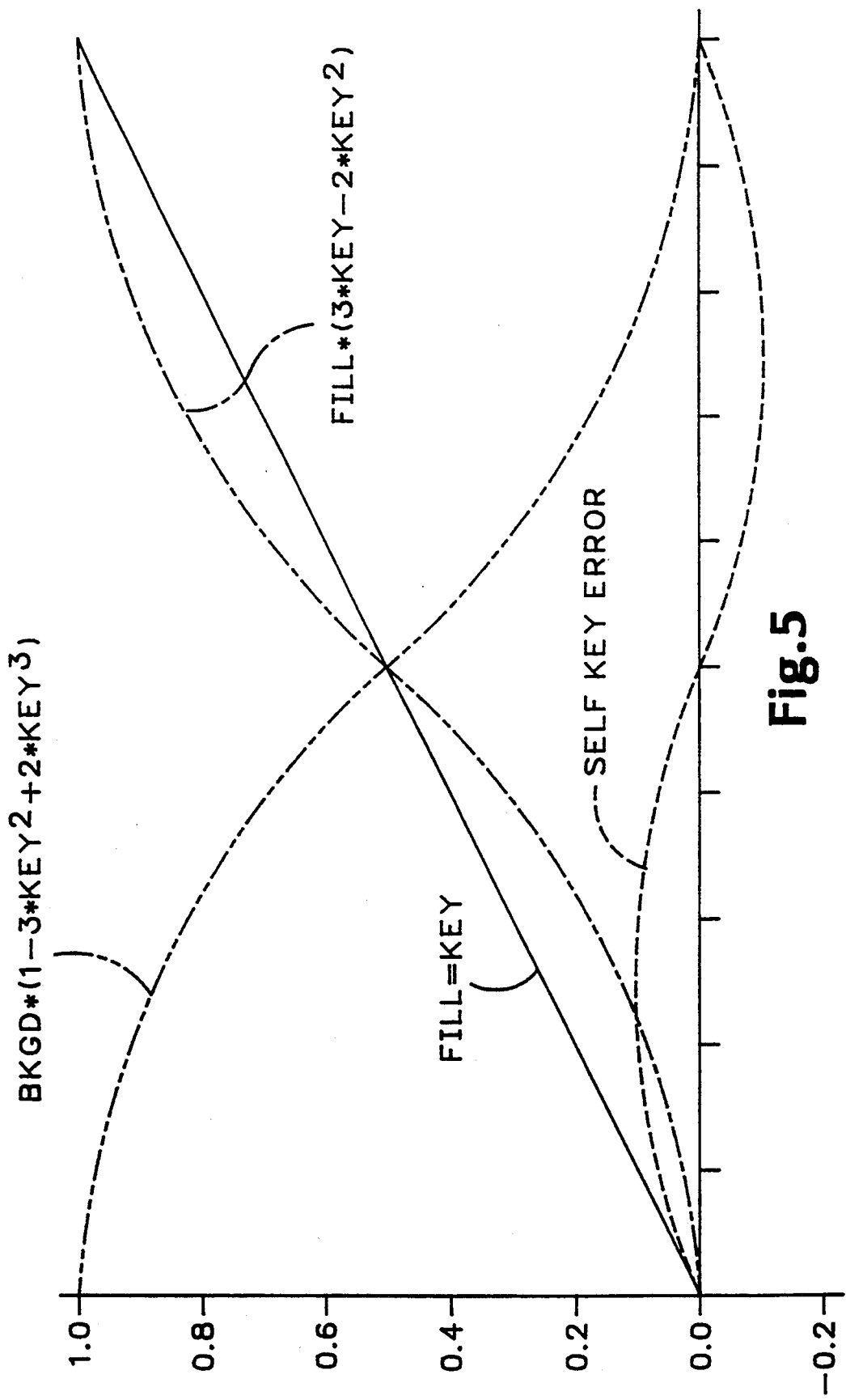
FIG. 5 is a graphic diagram illustrating a third transfer function for the self keyer according to the present invention.

This case has important implications. As is illustrated in FIG. 5 the shaping or reshaping of FILL by $(3*KEY - 2*KEY^2)$ results in the fill transition being S-shaped. While not linear there are situations when this provides positive benefits. Low level noise in FILL are compressed and are not as noticeable as in an additive key. Fine detail and highlights are reproduced better than in a multiplicative key. The self key error is much less that with a multiplicative key and is filled with BKGD. This function, when applied in the general form, results in a compromise between additive and multiplicative key characteristics in that the result is less noisy than the additive key while preserving detail and avoiding the gap of the multiplicative key.

Another function is $f(KEY) = 2 - KEY$:

$$\text{Composite} = \text{FILL}*(2-\text{KEY}) + \text{BKGD}*(1-2*\text{KEY}+\text{KEY}^2)$$

Figure 6:
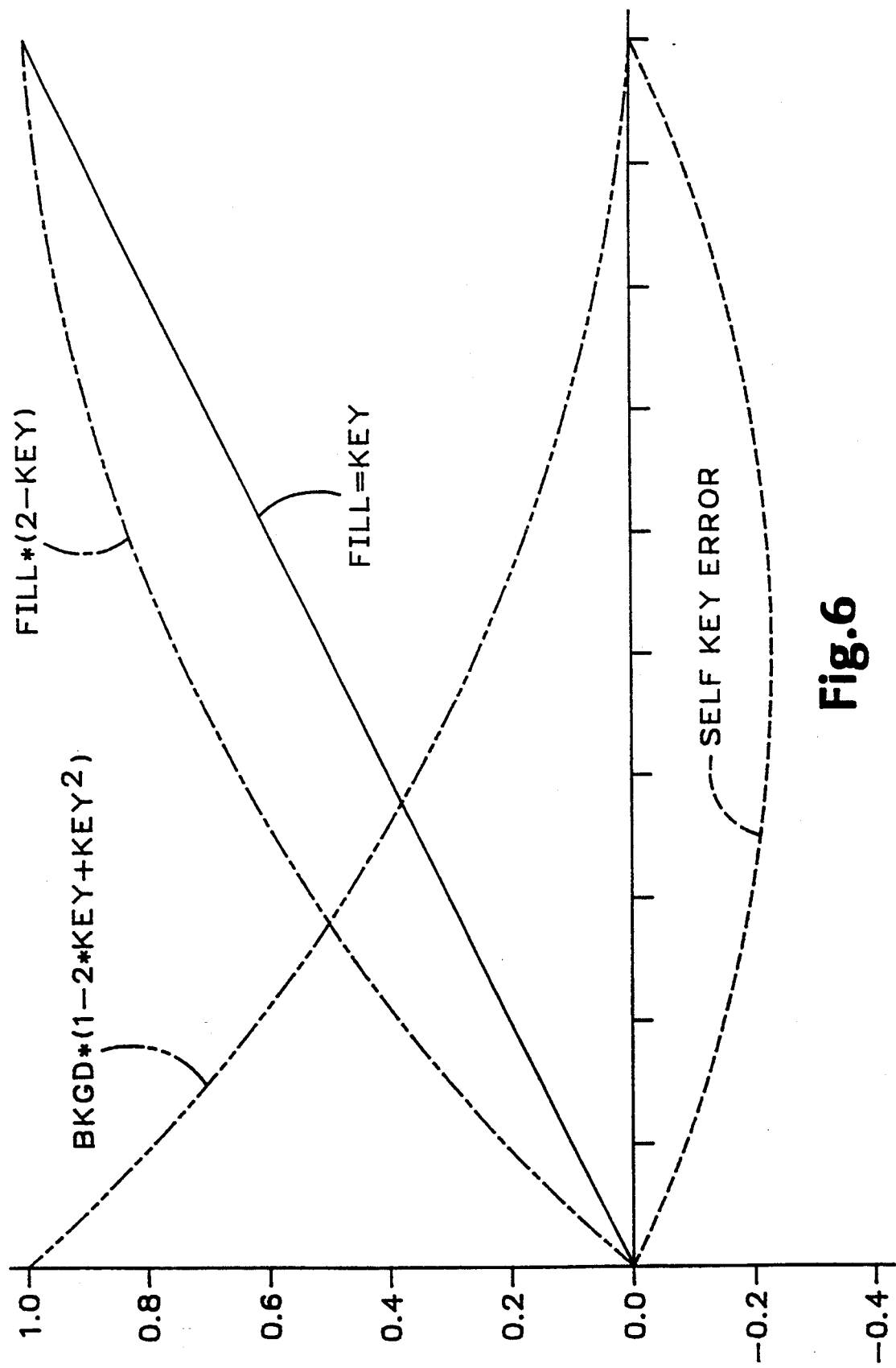
FIG. 6 is a graphic diagram illustrating a fourth transfer function for the self keyer according to the present invention.

As illustrated in FIG. 6 this widens the edge of FILL beyond the additive key and emphasizes the fill edge during a transition. In this case BKGD is actually removed because the self key error manifests as an excess of FILL. This function accentuates detail in FILL at the cost of gain in noise. It demonstrates an opposite to the multiplicative key and provides an appearance of resizing the key.

Figure 7:
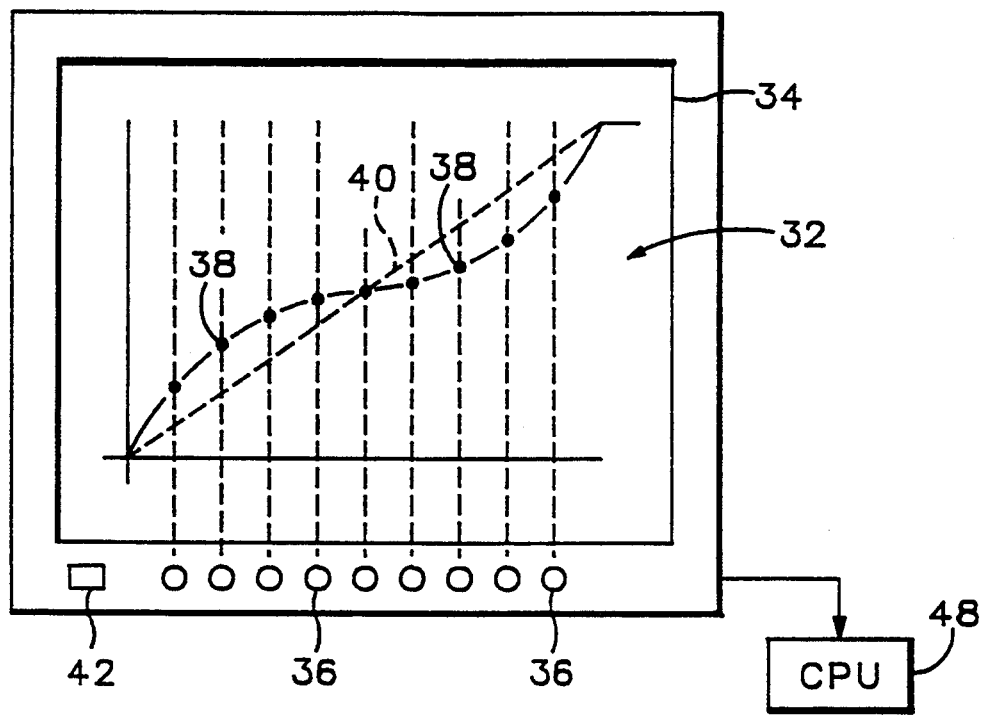
FIG. 7 is a plan view of an interface for the self keyer according to the present invention.
Figure 8:
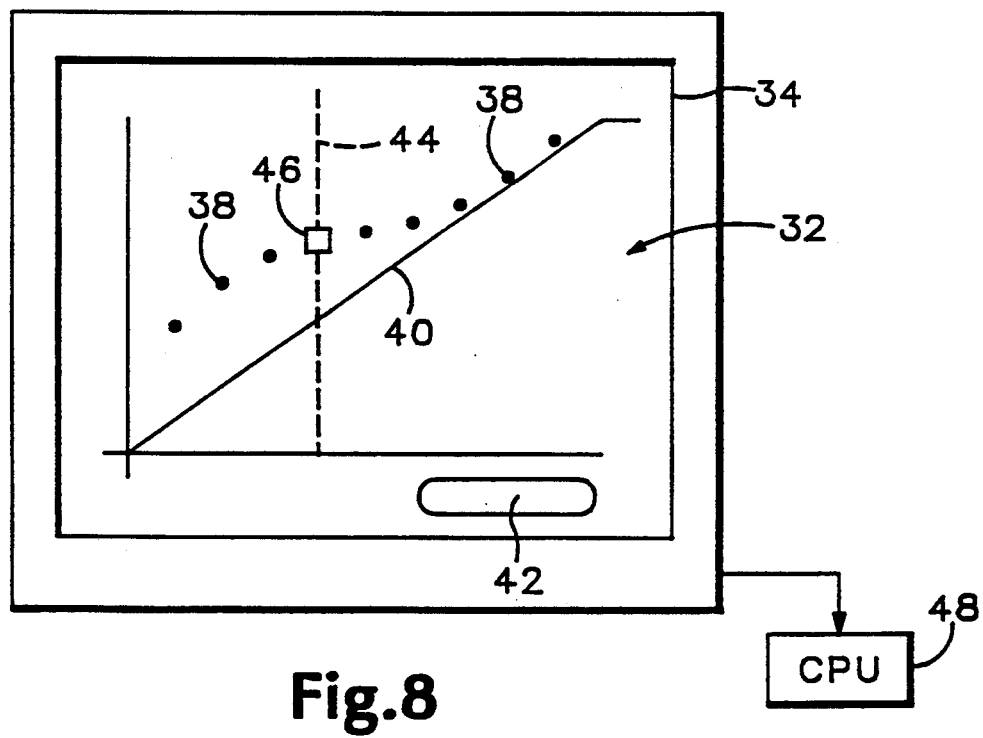
FIG. 8 is a plan view of an alternative embodiment of the interface for the self keyer according to the present invention.

In fact there exists a continuum of transfer functions that may be applied in the general form expression which provides the operator of the keyer 10 with flexibility in manipulating the edge of the fill part of the scene while filling the gap caused by self key error with background. With such flexibility a graphic interface may be used to allow more flexible control than simply selecting a prestored function in the PROM/RAM 24 or one downloaded from the CPU. FIG. 7 shows one interface where a display 32 of the transfer function, which could be on a screen 34 as shown or in the form of discrete indicators, is controlled by a plurality of knobs 36. Each knob 36 controls a point 38 on the transfer function. As each knob 36 is manipulated to adjust the associated point 38 up or down, the CPU 48 finds a ratio of the adjusted value to a default value that is a straight line function 40. This ratio is f(KEY) for that point and may be loaded into the PROM/RAM 24. Interpolation between values may be used to determine f(KEY) between the adjustment points 38, and smoothing may be used to make f(KEY) more continuous. A button 42 may be provided to cause the values controlled by the knobs 36 to revert to the default values.

An alternate interface is very similar, only the control is made from a mouse, trackball, joystick or some other computer workstation pointing device. The operator moves a cursor 44 to a point 38 on the transfer function display 32 and selects it. The operator may then adjust the selected point 46 up or down. An algorithm may be used so that adjacent points 38 are affected proportionally, like moving a point up or down on a stretched elastic to smooth the affect of the movement of the selected point 46.

Thus the present invention provides a self keyer that uses background to fill a gap between fill and background when the two video signals are composited to form a single scene, the function being of a general flexible form using a key transform function for reshaping the fill and for cutting a hole in the background for the fill.

What is claimed is:

1. A self keyer comprising:
    means for deriving a key signal from a fill video signal;
    means for generating a control signal from the key signal according to a transfer function and for generating a mixer control signal that is a function of the control signal and the key signal;
    means for shaping the fill video signal with the control signal to produce a shaped fill video signal;
    means for cutting a hole in a background video signal with the mixer control signal to produce a shaped background video signal; and
    means for combining the shaped fill and background video signals to form a composite video signal;
    whereby the background video signal fills a gap in the composite video signal between the shaped fill and background video signals.

2. The self keyer as recited in claim 1 further comprising means for interactively varying the transfer function.

3. The self keyer as recited in claim 1 wherein the generating means comprises:
    means for storing the transfer function as a lookup table that is accessed by the key signal to output the control signal; and
    means for multiplying the control signal by the key signal to produce the mixer control signal.

4. The self keyer as recited in claim 3 wherein the multiplying means comprises means for storing a second transfer function that is the product of the first transfer function and the key signal, the second transfer function storing means being accessed by the key signal to output the mixer control signal.

5. A self keying method comprising the steps of:
    deriving a key signal from a fill video signal;
    generating a control signal from the key signal according to a transfer function and generating a mixer control signal that is a function of the control signal and the key signal;
    shaping the fill video signal with the control signal to produce a shaped fill video signal;
    cutting a hole in a background video signal with the mixer control signal to produce a shaped background video signal; and
    combining the shaped fill and background video signals to form a composite video signal;
    whereby the background video signal fills a gap in the composite video signal between the shaped fill and background video signals.

6. The self keying method as recited in claim 5 further comprising the step of interactively varying the transfer function.

7. The self keying method as recited in claim 5 wherein the generating step comprises the steps of:
    storing the transfer function as a lookup table that is accessed by the key signal to output the control signal; and
    multiplying the control signal by the key signal to produce the mixer control signal.

8. The self keying method as recited in claim 7 wherein the multiplying step comprises the step of storing a second transfer function that is the product of the first transfer function and the key signal, the second transfer function being accessed by the key signal to output the mixer control signal.

* * * * *